United States Patent [19]

Shigemori et al.

[11] Patent Number: 5,753,156
[45] Date of Patent: May 19, 1998

[54] PROCESS FOR PRODUCING NON-SCATTERING HOLLOW PLASTIC BALLOONS

[75] Inventors: Yoshihiro Shigemori; Osamu Saito; Yoshihiro Usui, all of Tokyo, Japan

[73] Assignee: Dainichiseika Color & Chemicals Mfg. Co., Ltd., Tokyo, Japan

[21] Appl. No.: 675,799

[22] Filed: Jul. 5, 1996

Related U.S. Application Data

[63] Continuation-in-part of Ser. No. 353,115, Dec. 9, 1994, abandoned.

[30] Foreign Application Priority Data

Dec. 28, 1993 [JP] Japan ................... 5-353486

[51] Int. Cl.$^6$ ............................................. C08J 9/22
[52] U.S. Cl. ................... 264/53; 264/51; 521/56
[58] Field of Search .................. 264/53, 45.4, DIG. 6; 521/56, 57

[56] References Cited

U.S. PATENT DOCUMENTS

| | | | |
|---|---|---|---|
| 3,615,972 | 10/1971 | Morehouse, Jr. et al. | 156/79 |
| 3,914,360 | 10/1975 | Gunderman et al. | 264/51 |
| 4,044,176 | 8/1977 | Wolinski et al. | 427/256 |
| 4,108,928 | 8/1978 | Swan, Jr. | 264/26 |
| 4,397,799 | 8/1983 | Edgren et al. | 264/53 |
| 4,722,943 | 2/1988 | Melber et al. | 521/57 |
| 4,829,094 | 5/1989 | Melber et al. | 521/57 |
| 4,891,387 | 1/1990 | Janda | 521/54 |
| 4,995,545 | 2/1991 | Wycech | 264/46.7 |
| 5,132,061 | 7/1992 | Lindeman et al. | 264/45.4 |

FOREIGN PATENT DOCUMENTS

| | | | |
|---|---|---|---|
| 0 484 893 A3 | 5/1992 | European Pat. Off. | |
| 62-141074 | 6/1987 | Japan . | |
| 4-71664 | 3/1992 | Japan . | |
| 4-292684 | 10/1992 | Japan . | |
| 5-1241 | 1/1993 | Japan . | |
| 5-25419 | 2/1993 | Japan . | |
| 6298984 | 10/1994 | Japan | 521/57 |
| 1442823 | 7/1976 | United Kingdom | 521/56 |

*Primary Examiner*—Allan R. Kuhns
*Attorney, Agent, or Firm*—Frishauf, Holtz, Goodman, Langer & Chick, P.C.

[57] ABSTRACT

A process for producing non-scattering hollow plastic balloons which comprises: (a) heating a mixture (A) of non-foamed plastic balloons and a first wetting agent, which is a plasticizer, to a temperature from 40° C. to a temperature which is 40° C. below an exit temperature of a heat exchanger, (b) contacting the mixture (A) with a second wetting agent being heated to a temperature equal to or above the foaming starting temperature of the non-foamed plastic balloons, wherein a ratio of the mixture (A) to the second wetting agent (B) is 1:0.5 to 1:1.5, the contacting being within 1 minute after heating the mixture (A) by the heat exchanger to a temperature ranging from 20° to 50° C. below the foaming starting temperature of the non-foamed plastic balloons, (c) foaming the non-foamed plastic balloons, and (d) cooling the resultant mixture from step (c) containing the foamed plastic balloons. Non-scattering foamed plastic balloons can thus be obtained simultaneously with the foaming. The present process needs a smaller amount of a plasticizer than the conventional process of wetting foamed plastic balloons with a plasticizer.

20 Claims, 1 Drawing Sheet

PROCESS FOR PRODUCING NON-SCATTERING HOLLOW PLASTIC BALLOONS

This application is a continuation-in-part application of application Ser. No. 08/353,115, filed Dec. 9, 1994, now abandoned.

BACKGROUND OF THE INVENTION

1. Field of the Invention

The present invention relates to a process for producing non-scattering hollow plastic balloons which are free from vigorous scattering of conventional hollow plastic balloons and difficulty in handling caused by the scattering.

2. Description of the Related Art

Fine powders of silica and plastics have heretofore been used in large amounts as fillers in various kinds of coating materials and plastics which require light weight because of their very light weight.

In recent years, for the purpose of achieving reduction in the weight of coated products such as automobiles, hollow plastic balloons having less weight than plastic powders are used as fillers of coating materials. Hollow plastic balloons can be used very effectively as fillers of coating materials and plastics for enhancing durability and reducing weight of coated materials and plastic molded articles.

Hollow plastic balloons are generally contained in a package such as a plastic bag or a container bag. When hollow plastic balloons are taken out of the package for mixing with a base material of a coating material or the like, the balloons are scattered in the air because of their very light weight. This causes serious problems in handling such as difficulty in the mixing operation and fouling of the working environment as well as the human body.

Particularly, hydrophobic hollow plastic balloons have drawbacks not only in that the balloons are scattered in the air to cause difficulty in handling when they are taken out of the package and charged into a mixer, but also in that, in conventional conditions of mixing, the balloons do not enter into the inner parts of a material for mixing but stay aggregated at the top of the material and a long time is required to achieve homogeneous dispersion.

For the purpose of preventing scattering of hollow plastic balloons having the light weight and the difficulty in handling as described above, a method of providing a wetting property to foamed plastic balloons by adding a plasticizer has been proposed by the present inventors (Japanese Patent Application Laid-Open No. Heisei 4(1992)-71664).

However, the surface area of foamed plastic balloons are extremely large and it takes a long time to coat a wetting agent (a plasticizer) uniformly on the surface of the balloons. As another problem, the wetting takes place more or less non-uniformly and a small amount of particles having the property of scattering tends to be left remaining. Therefore, the wetting agent (the plasticizer) has practically to be used in an amount larger than the theoretically sufficient amount.

In general, when a mixture of non-foamed plastic balloons and a plasticizer is heated to start foaming, foamed parts generated by the local foaming have a heat insulating effect and heating of the parts which have not been foamed is retarded by the insulating effect. This phenomenon causes a situation in which parts not foamed and parts foamed excessively are mixed together and uniformly foamed balloons cannot be obtained. Various methods have been attempted to solve the problem but it has been difficult to obtain a uniformly foamed material because of the extremely low heat conductivity of the foamed part. A process in which balloons are heated to a temperature higher than the foaming starting temperature under pressure and then foamed by reducing the pressure is effective for the preparation of uniformly foamed balloons. However, this process causes an increase in the cost of apparatus and is not preferable.

SUMMARY OF THE INVENTION

The present invention has been made to overcome the difficulties described above. The present invention accordingly has an object to provide a process for producing non-scattering hollow plastic balloons in which non-foamed plastic balloons (plastic balloons which are to be used after being foamed but have not been foamed yet) dispersed in a wetting agent such as a plasticizer in advance are heated to a temperature close to the foaming starting temperature of the non-foamed plastic balloons, preferably ranging from 20° C. to 50° C. below the foaming starting temperature of the non-foamed plastic balloons, then brought into contact with a separate plasticizer which has been heated to a temperature higher than the foaming starting temperature of the non-foamed plastic balloons in advance, instantaneously foamed, and transferred to a cooling process immediately when the foaming is finished to prevent excessive foaming.

Thus, the process for producing non-scattering hollow plastic balloons of the present invention comprises forming a mixture (A) by mixing non-foamed plastic balloons and a wetting agent (a plasticizer) at a temperature below the foaming starting temperature of the non-foamed plastic balloons, bringing the mixture (A) into contact with a wetting agent (a plasticizer) (B) heated to a temperature equal to or above the foaming starting temperature of the non-foamed plastic balloons, foaming the non-foamed plastic balloons, and cooling the mixture containing the foamed plastic balloons.

The present invention is thus directed to a process process for producing non-scattering hollow plastic balloons comprising:

(a) heating a mixture (A) of non-foamed plastic balloons and a first wetting agent, which is a plasticizer, at a temperature ranging from 40° C. to a temperature which is 40° C. below an exit temperature of a heat exchanger, (b) contacting the mixture (A) with a second wetting agent (B), which is a plasticizer, the second wetting agent being heated to a temperature equal to or above a foaming starting temperature of the non-foamed plastic balloons, wherein a ratio of the mixture (A) to the second wetting agent (B) is 1:0.5 to 1:1.5, said contacting being within one minute after heating the mixture (A) by the heat exchanger to a temperature of 20° to 50° C. below the foaming staring temperature of the non-foamed plastic balloons, (c) foaming the non-foamed plastic balloons, and (d) cooling the resultant mixture from step (c) containing the foamed plastic balloons.

The present invention also concerns a process for producing non-scattering hollow plastic balloons comprising:

(a) heating a mixture (A) of non-foamed plastic balloons and a first wetting agent, which is plasticizer, to a temperature of 40° C. to 80° C., (b) contacting the mixture (A) with a second wetting agent (B), which is a plasticizer, the second wetting agent being heated to a temperature equal to or above a foaming starting temperature of the non-foamed plastic balloons, wherein a ratio of the mixture (A) to the second wetting agent (B) is 1:05 to 1:1.5, said contacting being within one minute after heating the mixture (A) by a heat exchanger to a temperature from 100° to 130° C., (c) foaming the non-foamed balloons, and (d) cooling the resultant mixture from step (c) containing the foamed plastic balloons.

Other and further objects, features and advantages of the invention will appear more fully from the following description.

BRIEF DESCRIPTION OF THE FIGURE

The invention will be described with reference to the accompanying drawing, wherein.

Figure 1:
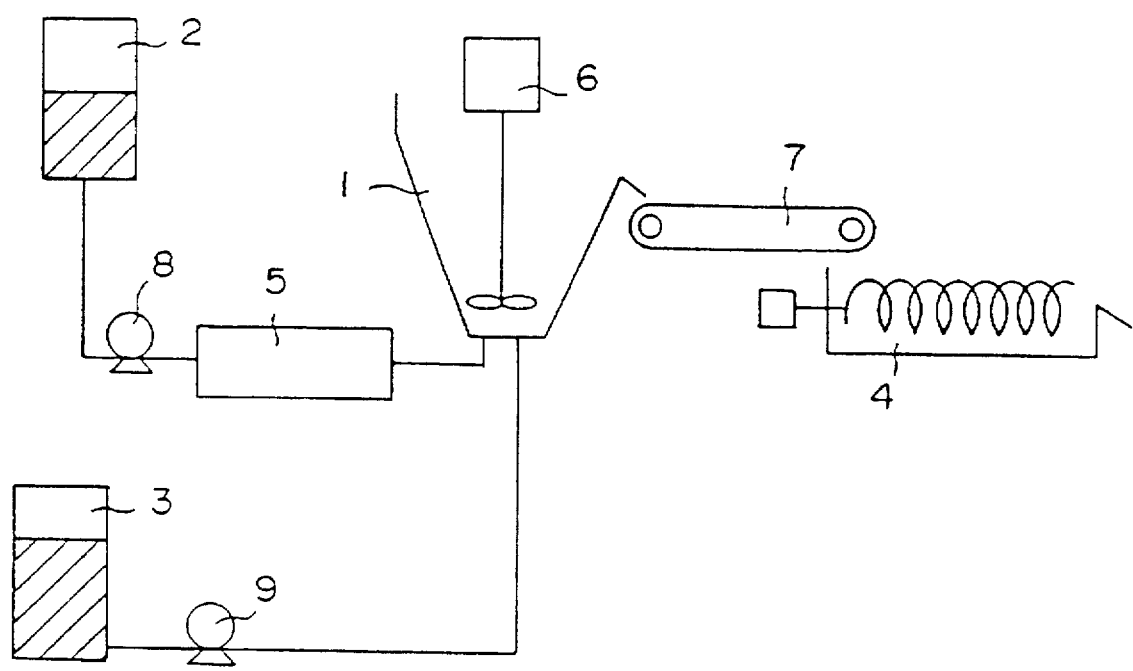
FIG. 1 shows a flow sheet of the apparatus for the present invention.

The numbers in the figures have the meanings as listed in the following:

1: a foaming tank
2: a heating tank for the fluid A
3: a heating tank fo r the fluid B
4: a cooling tank
5: a heat exchanger
6: a stirrer
7: a conveyor
8: a pump
9: a pump

DETAILED DESCRIPTION OF THE INVENTION

The present invention is described in more detail in the following.

In the process of the present invention, non-foamed plastic balloons are dispersed in a plasticizer. Plastic balloons which are to be used after being foamed but have not been foamed yet are referred to as "non-foamed plastic balloons" hereinafter. The dispersion is adjusted to such a fluid condition that the dispersion can be quantitatively transferred by using a pump. This dispersion heated to a temperature below the foaming starting temperature of the non-foamed plastic balloons is referred to as the mixture (A). The mixture (A) is mechanically mixed with a plasticizer (B) which is heated to a temperature equal to or above the foaming starting temperature of the non-foamed plastic balloons in advance, at the tips of pipes connected to the pump for the mixture (A) and the pump for the plasticizer (B). The foaming starting temperature is the lowest temperature at which the foaming proceeds. The plastic balloons are instantaneously foamed when the mixture (A) and the plasticizer (B) are brought into contact with each other. The plastic balloons thus foamed are cooled to prevent excessive foaming by the residual heat and the object material can be obtained.

The non-foamed plastic balloons used in the present invention are micro-balloons of a thermoplastic resin containing an organic solvent having a low boiling point therein. Examples of the balloons include balloons made of an acrylonitrile/methacrylonitrile resin containing pentane or hexane therein and having a foaming starting temperature of 145° to 155° C., particle diameters of 15 to 25 μm and a true specific gravity of 1.02.

The hollow plastic balloons are generally contained in a package such as a plastic bag or a container bag for handling.

Examples of the plasticizer used in the present invention for the purpose of wetting the plastic balloons include: phthalic acid ester plasticizers, such as dimethyl phthalate (DMP), diethyl phthalate (DEP), dibutyl phthalate (DBP), heptylnonyl phthalate (HNP), di-2-ethylhexyl phthalate (DOP), di-n-octyl phthalate (DNOP), di-i-octyl phthalate (DIOP), di-sec-octyl phthalate (DCapP), di-i-decyl phthalate (DIDP), ditridecyl phthalate (DTDP), dicyclohexyl phthalate (DCHP), butylbenzyl phthalate (BBP), ethylphthalyl ethyl glycolate (EPEG), butylphthalyl butyl glycolate (BPBG), and the like; aliphatic dibasic acid ester plasticizers, such as di-2-ethylhexyl adipate (DOA), diisodecyl adipate (DIDA), di(methylcyclohexyl) adipate, di-n-hexyl azelate (DNHZ), di-2-ethylhexyl azelate (DOZ), dibutyl sebacate (DBS), di-2-ethylhexyl sebacate (DOS), and the like; citric acid ester plasticizers, such as triethyl citrate (TEC), tribuyl citrate (TBC), triethyl acetylcitrate (ATEC), tributyl acetylcitrate (ATBC), tricyclohexyl acetylcitrate, and the like; epoxy plasticizers, such as epoxidized soybean oil (ESBO), di-2-ethylhexyl 4,5-epoxycyclohexane-1,2-dicarboxylate (E-PS), diisodecyl 4,5-epoxycyclohexane-1, 2-dicarboxylate (E-PE), glycidyl oleate, allyl 9,10-epoxystearate, 2-ethylhexyl 9,10-epoxystearate, epoxidized tall oil fatty acid 2-ethylhexyl ester, bisphenol A glycidyl ether, and the like; phosphoric acid ester plasticizers, such as tributyl phosphate (TBP), triphenyl phosphate (TPP), toxyldiphenyl phosphate, tripropylene glycol phosphate, and the like; and fatty acid ester plasticizers, such as butyl stearate (BS), methyl acetylricinolate (MAR), ethyl acetylricinolate (EAR), and the like.

In the process of the present invention, additives generally used in the present field, such as fillers, stabilizers, antistatic agents, coloring agents, and the like, may be mixed together with the materials described above. The additives are not particularly limited.

The fluid (A) [the mixture (A)] and the fluid (B) [the wetting agent or the plasticizer (B)] in the present invention are adjusted to the following conditions in accordance with the reasons also described in the following. The fluid A is a dispersion containing the non-foamed plastic balloons and the plasticizer and has fluidity suitable for transfer with a pump or the like. The amounts of the non-foamed plastic balloons and the plasticizer in the fluid (A) are decided depending on particle diameters and specific gravity of the non-foamed plastic balloons. The ratio by weight of the non-foamed plastic balloons and the plasticizer in the fluid (A) are generally in the range of about 100:50 to about 100:200. The reason is that the fluid B [the plasticizer (B)] is the source of heat energy necessary for foaming of the non-foamed plastic balloons in the fluid A. It is preferred that the temperature of the fluid A is close to the foaming starting temperature of the non-foamed plastic balloons because of easier foaming. However, it is necessary that the temperature of the fluid A is kept in such a range that the non-foamed plastic balloons are not swelled by the plasticizer. The reason is that, when the fluidity of the fluid A is decreased by swelling, transfer of the fluid A by a pump becomes difficult. On the other hand, it is necessary that the temperature of the fluid B is set sufficiently high for starting foaming of the plastic balloons in the fluid A. However, a temperature of the fluid B higher than the necessary value is not only inconvenient for cooling but also disadvantageous in view of safety.

The ratio of mixture (A) (containing the non-foamed plastic balloons and a first wetting agent or plasticizer) to a second wetting agent or plasticizer (B), which is added to mixture (A), is 1:0.5 to 1:1.5, preferably 1:0.71 to 1:1.

If the ratio of (A) to (B) is in a range of 1:0.5 to 1:1.5, a resultant mixture containing the foamed balloons can be cooled with a gas stream such as air or the like, or by maintaining room temperature, without adding a plasticizer for cooling. It is an important point that the smallest amount of the wetting agent (plasticizer) be used for cooling after foaming. To determine the ratio of the fluid (A) to (B), a ratio which affords that the fluid (A) has a fluidity to be capable of being transferred by a pump, is preferable. Additives such as a surface active agent, a coupling agent and the like may be added to the mixture (A) to obtain the requisite fluidity. It is desirable that the amount of the fluid (B), which is a heat source, be as low as possible. The smaller an amount of plasticizer having a larger specific heat, the more the air cooling will be effective and the sooner cooling will occur.

The first wetting agent or plasticizer which is added to the non-foamed plastic balloons can be the same or different than the second wetting agent or plasticizer. It is preferred that the first wetting agent or plasticizer be the same as the second wetting agent or plasticizer.

To summarize the advantages obtained by the invention, non-scattering foamed plastic balloons can be obtained simultaneously with the foaming. The process of the present invention needs a smaller amount of a plasticizer than the conventional process of wetting the foamed plastic balloons with a plasticizer.

The invention will be understood more readily with reference to the following examples; however, these examples are intended to illustrate the invention and are not to be construed to limit the scope of the invention.

EXAMPLE 1

An apparatus shown in FIG. 1 was used. In the apparatus, a heating tank for the fluid A 2 and a heating tank for the fluid B 3 were connected to a foaming tank 1 through pumps 8 and 9. The apparatus was equipped also with a conveyor 7 and a cooling tank 4. A heat exchanger 5 was placed between the pump 8 and the foaming tank 1. The foaming tank was equipped with a stirrer 6. Into the heating tank for the fluid A 2, a mixture (referred to as Fluid A hereinafter) prepared by mixing 1000 parts by weight of non-foamed plastic balloons [Matsumoto Microsphere F-80SD; a product of Matsumoto Yusi Seiyaku Co., Ltd.] and 2000 parts by weight of a plasticizer diisononyl phthalate, hereinafter referred tp as "DINP" to the form of a homogeneous dispersion was charged and heated to 80° C. Into the heating tank for the fluid B 3, a plasticizer (DINP; referred to as Fluid B hereinafter) heated to 180° C. in advance was charged. The foaming tank 1 was kept at about 150° C. to prevent cooling. The pumps 8 and 9 were each adjusted to have the transfer speed of 15 kg/hr. Temperature of Fluid A was adjusted to 120° C. with the heat exchanger 5. The pumps 8 and 9 were started in such a manner that Fluid A of 120° C. and Fluid B of 180° C. were charged to the foaming tank 1 simultaneously. Fluid A and Fluid B which had been heated were mixed by stirring with mixing blades (rotated at 1000 rpm) of the stirrer 6 in the foaming tank 1. The non-foamed plastic balloons were heated to the foaming temperature and instantaneously foamed. The foamed plastic balloons were continuously discharged from the upper part of the foaming tank. The foamed plastic balloons at the temperature of 140° C. were transferred to the cooling tank 4 with the conveyor 7 and taken out of the cooling tank after they were cooled to about 50° C. The foamed plastic balloons thus obtained had the shape of a sphere and the apparent specific gravity of 0.04, were wet and swelled uniformly and showed no scattering at all.

EXAMPLE 2

Wet and swelled hollow plastic balloons containing the plasticizer and the hollow plastic balloons in a ratio of 29:7 and showing no scattering at all were obtained by the same process as that in Example 1 except that the transfer speed of the pump 8 was adjusted to 21 kg/hr, the transfer speed of the pump 9 was adjusted to 15 kg/hr, and the temperature of Fluid B was adjusted to 188° C.

EXAMPLE 3

Wet and swelled hollow plastic balloons containing the plasticizer and the hollow plastic balloons in a ratio of 5:1 and showing no scattering at all were obtained by the same process as that in Example 1 except that a mixture (Fluid A) prepared by mixing 1000 parts by weight of non-foamed plastic balloons [Matsumoto Microsphere F-50D; a product of Matsumoto Yusi Seiyaku Co., Ltd.] and 2000 parts by weight of a plasticizer (DINP) to the form of a homogeneous dispersion was charged into the heating tank for the fluid A 2 and heated to 80° C., Fluid B was heated to 170° C. in advance, and the temperature of Fluid A was adjusted to 110° C. with the heat exchanger 5.

As shown in the above, the treatment for non-scattering of the present invention can be performed by adjusting set temperatures of various parts in accordance with the foaming temperature of the non-foamed plastic balloons used.

EXAMPLE 4

Foamed plastic balloons were obtained by the same process as that in Example 1 except that a mixture prepared by mixing 800 parts by weight of a plasticizer (DINP) and 200 parts by weight of calcium carbonate (NS-100; a product of Shiraishi Kogyo Co., Ltd.) to the form of a homogeneous dispersion was charged into the heating tank for fluid B. The foamed plastic balloons thus obtained were wet and swelled, showed no scattering at all and were in the condition that calcium carbonate was attached to the surface uniformly.

EXAMPLE 5

Wet and swelled plastic balloons containing the plasticizer and the hollow plastic balloons in a ratio of 61:10 and showing no scattering were obtained by the same process as that in Example 1, except that the transfer speed of the pump 8 was adjusted to 11 kg/hr, the first heating temperature of fluid (A) was adjusted to 40° C., the second heating temperature of fluid (A) was adjusted to 100° C., and the temperature of fluid (B) was adjusted to 186° C.

EXAMPLE 6

Wet and swelled plastic balloons containing the plasticizer and the hollow plastic balloons in a ratio of 19:5 and showing no scattering were obtained by the same process as that in Example 1, except that the transfer speed of the pump 8 was adjusted to 25 kg/hr., the second heating temperature of fluid (A) was adjusted to 130° C., and the temperature of fluid (B) was adjusted to 184° C.

EXAMPLE 7

Wet and swelled plastic balloons containing the plasticizer and the hollow plastic balloons in a ratio of 133:50 and showing no scattering were obtained by the same process as that in Example 1, except that the ratio by weight of the non-foamed plastic balloons and the plasticizer (DINP) in the fluid (A) was 1000 parts: 700 parts, the transfer speed of the pump 8 was adjusted to 13 kg/hr., the first heating temperature of fluid (A) was adjusted to 60° C., and the temperature of fluid (B) was adjusted to 175° C.

EXAMPLE 8

Wet and swelled plastic balloons containing the plasticizer and the hollow plastic balloons in a ratio of 79:20 and showing no scattering were obtained by the same process as that in Example 1, except that the ratio by weight of the non-foamed plastic balloons and the plasticizer (DINP) in the fluid (A) was 1000 parts: 1700 parts, the transfer speed of the pump 8 was adjusted to 18 kg/hr. and the temperature of fluid (B) was adjusted to 188° C.

COMPARATIVE EXAMPLE 1

Foamed plastic balloons were obtained by the same process as that in Example 1 except that Fluid A of 25° C. in the heating tank was transferred to the heat exchanger 5 by the pump 8 at the transfer speed of 30 kg/hr and heated to 120° C. at the heat exchanger 5, and Fluid B of 180° C. was transferred into the foaming tank 1 by the pump 9 in such a manner that the ratio by weight of Fluid A to Fluid B was 1:1. The condition of the operation was observed every 10 minutes to examine stability of the operation. In about 40 minutes, swelled particles were found in the plastic balloons transferred from the heat exchanger 5. In about 50 minutes, foamed particles were found in the plastic balloons transferred from the heat exchanger. After about 80 minutes, the plastic balloons were foamed in the heat exchanger and stable transfer of the plastic balloons was not possible. When transfer speeds of Fluid A and Fluid B were both adjusted to 10 kg/hr and foamed plastic balloons were prepared otherwise in the same conditions, stable transfer of the balloons were not possible after about 140 minutes. The major cause of the trouble in the present comparative example is that, when Fluid A of 25° C. was heated to 120° C. in the heat exchanger, Fluid A was locally heated to a temperature higher than 120° C. at some parts in the heat exchanger to cause swelling or foaming of the non-foamed plastic balloons and some parts of the plastic balloons stayed in the heat exchanger.

COMPARATIVE EXAMPLE 2

Wet and swelled foamed plastic balloons were obtained by the same process as that in Example 1 except that the heat exchanger 5 shown in FIG. 1 was not used, and the temperature of Fluid B was adjusted to 190° C. when the temperature of Fluid A was adjusted to 110° C. in the heating tank for the fluid A and to 180° C. when the temperature of Fluid A was adjusted to 120° C. in the heating tank for the fluid A. While the operation was continued, the plastic balloons were swelled with the plasticizer in the heating tank for fluid A and stable transfer by the pump 8 became disturbed. On the other hand, when the temperature of Fluid A was kept at a temperature below 80° C. to avoid swelling with the plasticizer and brought into contact with Fluid B for foaming, Fluid B had to be heated above the flash temperature. This process was not suitable as a process for the industrial production.

COMPARATIVE EXAMPLE 3

Foamed plastic balloons were obtained by the same process as that in Example 1, except that the transfer speed of the pump 9 was adjusted to 30 kg/hr, and the temperature of fluid (B) was adjusted to 165° C. The cooling was not good. Shrinking by excess foaming occurred.

What is claimed is:

1. A process for producing non-scattering hollow plastic balloons comprising:
    (a) heating 100 parts by weight of a mixture (A) of non-foamed plastic balloons and a first wetting agent, which is a plasticizer, to a first temperature between 40° C. and a temperature which is 30° C. below a second temperature, said second temperature being 20° C. to 50° C. below a foaming starting temperature of the non-foamed plastic balloons,
    (b) heating the mixture (A) to said second temperature which is 20° C. to 50° C. below the foaming starting temperature of the non-foamed plastic balloons,
    (c) contacting the mixture (A) with 50 to 150 parts by weight of a second wetting agent (B), which is a plasticizer, the second wetting agent being heated to a third temperature which is equal to or above the foaming starting temperature of the non-foamed plastic balloons,
    (d) foaming the non-foamed plastic balloons, and
    (e) cooling the resultant mixture from step (d) containing the foamed plastic balloons.

2. The process for producing non-scattering hollow plastic balloons according to claim 1, wherein the non-foamed plastic balloons are micro-capsules of a thermoplastic resin containing an organic solvent having a low boiling point therein.

3. The process for producing non-scattering hollow plastic balloons according to claim 1, wherein the non-foamed plastic balloons are balloons of an acrylonitrile/methacrylonitrile resin having diameters of 15 to 25 μm and containing pentane or hexane therein.

4. A process for producing non-scattering hollow plastic balloons according to claim 3, wherein the first wetting agent and the second wetting agent are the same or different and are selected from the group consisting of diisodecyladipate, dibutyl phthalate and diisononyl phthalate.

5. A process for producing non-scattering hollow elastic balloons according to claim 3, wherein the first wetting agent and the second wetting agent are diisononyl phthalate.

6. The process for producing non-scattering hollow balloons according to claim 5, wherein said mixture (A) in step (c) is at 120° C., said second wetting agent (B) is at 180° C. and the foamed balloons are cooled in step (e) from 140° to 50° C.

7. The process for producing non-scattering hollow plastic balloons according to claim 1, wherein the wetting agent is selected from the group consisting of diisodecyl adipate (DIDA), dibutyl phthalate (DBP), and diisononyl phthalate (DINP).

8. The process for producing non-scattering hollow plastic balloons according to claim 1, wherein the mixture (A) comprises 100 parts by weight of the non-foamed plastic balloons and 50 to 200 parts by weight of the the first wetting agent.

9. A process for producing non-scattering hollow plastic balloons according to claim 1, wherein the first wetting agent and the second wetting agent are the same or different and are selected from the group consisting of a phthalic acid ester plasticizer, an aliphatic dibasic acid ester plasticizer, a citric acid plasticizer, an epoxy plasticizer, a phosphoric acid plasticizer and a fatty acid plasticizer.

10. A process for producing non-scattering hollow plastic balloons according to claim 1, wherein the first wetting agent and the second wetting agent are the same or different and are selected from the group consisting of dimethyl phthalate, diethyl phthalate, heptylnonyl phthalate, di-2-ethylhoxyl phthalate, di-i-octyl phthalate, di-n-octyl phthalate, di-sec-octyl phthalate, di-i-decyl phthalate, ditridecyl phthalate, dicyclohexyl phthalate, butylbenzyl phthalate, ethylphthalyl ethyl glycolate, butylphthalyl butyl glycolate, di-2-ethylhexyl adipate, di(methylcyclohexyl) adipate, di-n-hexyl azelate, di-2-ethylhexyl azelate, dibutyl sebacate, di-2-ethylhexyl sebacate, triethyl citrate, tribuyl citrate, triethyl acetylcitrate, tributyl acetylcitrate, tricyclohexyl acetylcitrate, epoxidized soybean oil, di-2-ethylhexyl 4,5-epoxycyclohexane-1,2-dicarboxylate, diisodecyl 4,5-epoxycyclohexane-1,2-dicarboxylate, glycidyl oleate, allyl 9,10-epoxystearate, 2-ethylhexyl 9,10-epoxystearate, epoxidized tall oil fatty acid 2-ethylhexyl ester, bisphenol A glycidyl ether, tributyl phosphate, triphenyl phosphate, toxyldiphenyl phosphate, tripropylene glycol phosphate, butyl stearate, methyl acetylricinolate and ethyl acetylricinolate.

11. The process for producing non-scattering hollow plastic balloons according to claim 10, wherein the non-foamed plastic balloons are balloons of an acrylonitrile/methacrylonitrile resin having diameters of 15 to 25 μm and containing pentane or hexane therein, and having a foaming starting temperature of 145° to 155° C.

12. The process for producing non-scattering hollow plastic balloons according to claim 11, wherein the mixture (A) comprises 100 parts by weight of the non-foamed plastic balloons and 50 to 200 parts by weight of the first wetting agent.

13. The process for producing non-scattering hollow balloons according to claim 1, wherein said mixture (A) is a dispersion containing the non-foamed plastic balloons and the first wetting agent, said mixture (A) having a fluidity sufficient for transfer; and said mixture (A) being at a temperature such that the non-foamed plastic balloons are not swelled.

14. The process for producing non-scattering hollow plastic balloons according to claim 1, wherein the ratio of said mixture (A) to said second wetting agent (B) is 1:0.71 to 1:1.

15. The process for producing non-scattering hollow plastic balloons according to claim 1, wherein the first wetting agent and the second wetting agent are the same.

16. The process for producing non-scattering hollow plastic balloons according to claim 1, wherein the heating in step (a) is carried out by a heat exchanger.

17. The process for producing non-scattering hollow plastic balloons according to claim 1, wherein the cooling in step (d) is carried out by air cooling.

18. The process for producing non-scattering hollow plastic balloons according to claim 1, wherein the contacting in step (b) occurs within one minute after the heating in step (a).

19. A process for producing non-scattering hollow plastic balloons according claim 1, which consists essentially of said steps (a) to (e).

20. A process for producing non-scattering hollow plastic balloons comprising:

(a) heating 100 parts by weight of a mixture (A) of non-foamed plastic balloons and a first wetting agent, which is a plasticizer, to a temperature of 40° C. and 80° C., (b) heating the mixture (A) by a heat exchanger to a temperature of 100° C. to 130° C., (c) contacting the mixture (A) with 50 to 150 parts by weight of a second wetting agent (B), which is a plasticizer, the second wetting agent being heated to a temperature equal to or above the foaming starting temperature of the non-foamed plastic balloons, said contacting occurring within one minute after heating the mixture (A) by the heat exchanger, (d) foaming the non-foamed plastic balloons, and (e) cooling the resultant mixture from step (d) containing the foamed plastic balloons.

* * * * *